Patent header omitted 3,111,410
METHOD OF PROLONGING THE SHELF LIFE OF COTTAGE CHEESE
Heinz Rode, Halstenbek, Holstein, Germany, assignor to W. R. Grace & Co., Cambridge, Mass., a corporation of Connecticut
No Drawing. Filed June 20, 1962, Ser. No. 203,746
2 Claims. (Cl. 99—116)

The present invention relates to a method of manufacturing cheese curd and more specifically, to a process for stabilizing the cheese curd before packaging so that the packaged cheese product has a longer shelf life.

The process of this invention is directed to the manufacture and stabilization of soft, unripened cheese, such as cottage cheese. Creamed style cottage cheese, both large and small curd type, is a commodity of significant and increasing volume to the dairy industry. To the housewife, it is a low calorie source of protein, minerals and vitamins, desirable for use in salads and as a supplement to cold meals. As a consequence, the demand is greatest during high temperature-high humidity weather. This perishable product is marketed and consumed fresh, frequently under a ten-day "removal-from-shelf" limit for retail packages. Deterioration normally results from the growth of spoilage-type bacteria, mold and yeast. Adequate control through sanitary methods, refrigeration and rapid distribution is essential for maintaining high quality during manufacture, packaging and marketing.

Cottage cheese is commonly packaged today in moisture-proof, but not air impermeable, containers, such as paraffin or plastic coated cardboard containers or molded plastic containers. However, the shelf life of cottage cheese in containers of this type is at best five to seven days at normal refrigeration temperatures. Since it is known that mold and yeast development requires the presence of oxygen, the obvious means to control mold is to seal the surface of the cheese from contact with oxygen.

If air is excluded from the package, yeast and mold will not develop; on the other hand, anaerobic bacteria responsible for the formation of gas will develop and balloon the air impermeable container. In addition, during the shelf life of conventionally packaged cottage cheese, the unfavorable condition of whey separation frequently occurs. This is attributed to a gradual abnormal breakdown of casein, with the release of a proportional amount of water. Authorities state that whey separation depends upon the manner in which the curd is treated during the manufacturing process. The temperatures used and the rate and amount of acid production are two critical factors which control the manner in which the moisture is bound up in the curd. After conducting extensive investigations, I believe that the problem of reduced keeping qualities of packaged cottage cheese is based on the following criteria:

(1) In standard procedures, the milk sugar or lactose in the starting milk material is not completely converted to lactic acid by the bacterial culture or "starter." As a result, there is an "after-acidification" or conversion of the remaining lactose to lactic acid in the cottage cheese which is greatly accelerated by the presence of oxygen. However, the process can and does proceed anaerobically as well.

(2) The after-acidification always results in a separation of whey, causing the packaged product to become unpalatable as well as presenting an unappetizing appearance.

(3) The transport stability of all prior known cottage cheese packages is so low, that even when using polyvinyl chloride containers, package breakage of up to 15 percent is considered normal.

Accordingly, it is the principal object of the present invention to provide an improved method for packaging cottage cheese which will overcome the disadvantages of yeast and mold formation by virtue of the fact that the cottage cheese is tightly packed into an air and moisture impermeable container, while at the same time insuring the prevention of ballooning of the container by gas-forming bacteria.

Another object of the present invention is to provide a hygienically wrapped cottage cheese package which can be stored up to three weeks and longer, and which has none of the disadvantages of whey separation, taste alterations, etc.

In its essentials, the method comprises converting a greater amount of the lactose in the starting milk material into lactic acid than is normally converted by the addition of more than 1 percent of a pure strain of *Streptococcus lactis* to the milk, carefully maintaining the pH of the curd within a range of 4.9 to 5.2 by flushing the curd with from 10 to 40 percent, preferably 20 to 35 percent by volume, distilled water (pH approximately 7.0) either before, during or after the addition of rennet extract, adding up to 1 percent or more sodium chloride and/or buffering salts depending upon the flavor desired, and finally, after drawing off the whey, the curd is pressed preferably through a tubular nozzle into an evacuated moisture and gas impermeable thermoplastic film tube, the ends of which are subsequently twisted and sealed tight, as for example with a metal clamp.

*Example I*

In this example, cheese curd was prepared in the usual manner as is described in a treatise on the manufacture of cheese entitled Cheese by L. L. Van Slyke and W. V. Price, published in 1952 by the Orange Judd Publishing Company, Inc., of New York, and packaged in accordance with the present invention. Skim milk was heated to 20° to 22° C. in a curd producing vat (a trough may be used) and 1 percent lactic acid culture was added. Rennet was added at the rate of 1 milliliter of the commercial extract per 1000 pounds of skim milk. The commercial extract of rennet is diluted in 40 times its volume of cold water to assist in distributing the rennet uniformly throughout the vat of milk. After five to six hours, the milk became a curd and had a pH of 5.0. The curd thus produced was subjected to the usual ripening, the partial conversion of the lactose into acid occurring in about twelve hours. The whey was then drawn off in the curd producer, or by working in a trough, and the curd was filled into curd sacks. Drawing off of the whey was discontinued after the whey reached a pH range of 4.9 to 5.2. The water content amounted to 70 to 80 percent depending upon the fat content. The fat content was adjusted accordingly in several samples when straining the curd in the usual manner. Several other samples were worked into creamed cottage cheese by the addition of cream. Several samples were then taken and each was packaged in a different manner. In Sample A, the cottage cheese was packaged in polyvinyl chloride cups having a capacity of 250 grams, and the cups were closed manually by placing a lid on the top. In Sample B, the cottage cheese was packaged according to the method of the present invention by forcing it through a pipe into a tube of gas and moisture impermeable thermoplastic film material, as is the standard practice in making sausages, twisting the ends of the tube and sealing the twisted portions with metal clamps. In several instances the tube and feed pipe were additionally evacuated. Various films may be employed in wrapping the cheese in accordance with the process of the invention. A suitable film material, for instance, may be a polyvinylidene chloride-polyvinylchloride film manufactured by the Cryovac Division of W. R.

Grace & Co. and sold under the trade name of "Cryovac." In this and following examples, the "Cryovac" film tube had inner diameters of 35 millimeters and 45 millimeters for 100 grams and 250 grams packages, respectively. The stability of the packaged cheese was determined organoleptically. The stability measured in days is shown in the following table.

|  | Fat Content, 10 percent | Fat Content, 30 percent |
|---|---|---|
| Sample A: Polyvinyl Chloride Cups __days__ | 4.5 | 6.0 |
| Sample B: Cryovac Film Tube— (without additional vacuum) do____ | 14.8 | 15.0 |
| (with additional vacuum) do____ | 18.0 | 17.5 |

*Example II*

In the following example, the lactose is substantially converted to lactic acid, and the excess lactic acid is flushed out with distilled water.

Twenty to thirty percent distilled water (pH approximately 7.0) was added to the starting milk material and the milk-water mixture was heated to approximately 20° C. to 22° C. The addition of rennet was calculated on the basis of the total amount of liquid (milk plus water) whereas the addition of the lactic acid culture or "starter" was calculated on the basis of the amount of milk alone and was equal to at least twice the amount of starter standardly employed e.g., 2 percent. Processing of the cheese curd was then carried out as in Example I, i.e., the whey was separated and the cottage cheese was packaged in a substantially air-free, gas and moisture impermeable film tube. The portions of cheese thus packaged showed no alteration in flavor or separation of whey, no yeast or mold formation and the quality, texture and body of the curd was maintained even after a three-week storage period. There was in addition no evidence of ballooning of the film tube.

*Example III*

The skim milk was treated as in Example II, adding the rennet and twice the amount of *Streptococcus lactis*, as in Example I, and flushing out the excess acid with 20 percent distilled water (approximately pH 7.0) after formation of the curd. The whey was then separated in the usual manner and when the curd was strained, the sodium chloride content was increased to about 1 percent. The portions of cheese packaged in the film tubes displayed a stability of more than twenty-four days.

It will be readily apparent to those skilled in the art to effect changes and modifications in the invention described in detail in the foregoing specification without departing from the scope and spirit thereof. The terminology used is for purposes of description and not of limitation, the scope of the invention being defined in the claims.

I claim:
1. A method of prolonging the shelf life of cottage cheese which comprises:
   (a) converting substantially all of the lactose present in the starting milk material to lactic acid by bacterial action and at the same time maintaining the pH between 4.9 and 5.2, and
   (b) placing the substantially lactose-free cottage cheese in a substantially evacuated, moisture-proof, substantially gas impervious container.

2. A method of prolonging the shelf life of cottage cheese which comprises:
   (a) converting substantially all of the lactose present in the starting milk material to lactic acid by the addition of more than 1 percent (by weight or volume) of the lactic acid forming culture while maintaining the pH between 4.9 and 5.2 by flushing the curd with neutral water, and
   (b) placing the substantially lactose-free cottage cheese in a substantially evacuated moisture-proof, substantially gas impervious container.

References Cited in the file of this patent

UNITED STATES PATENTS 2,701,204    Streznski _____ Feb. 1, 1955
2,955,045    Coffey et al. _____ Oct. 4, 1960

OTHER REFERENCES

Wilson et al.: The Manufacture of Low-Acid Rennet Type Cottage Cheese, February 1934, 10 pages. (Copy in Div. 63.)